(12) United States Patent
King et al.

(10) Patent No.: US 7,089,248 B1
(45) Date of Patent: Aug. 8, 2006

(54) GROUP FILE DELIVERY INCLUDING USER-DEFINED METADATA

(75) Inventors: James C. King, Santa Cruz, CA (US); Xintai Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 566 days.

(21) Appl. No.: 10/288,322

(22) Filed: Nov. 4, 2002

(51) Int. Cl.
*G06F 17/30* (2006.01)

(52) U.S. Cl. .............. 707/10; 707/104.1; 715/513; 715/515; 345/838

(58) Field of Classification Search ............. 707/1, 707/3, 9, 102, 10, 104.1; 715/513, 515; 345/838
See application file for complete search history.

(56) References Cited

U.S. PATENT DOCUMENTS

| | | | |
|---|---|---|---|
| 5,625,711 A | 4/1997 | Nicholson et al. | |
| 5,729,637 A | 3/1998 | Nicholson et al. | |
| 5,999,649 A | 12/1999 | Nicholson et al. | |
| 6,366,695 B1 | 4/2002 | Nicholson et al. | |
| 6,385,350 B1 | 5/2002 | Nicholson et al. | |
| 6,507,858 B1* | 1/2003 | Kanerva et al. | 715/515 |
| 6,585,777 B1* | 7/2003 | Ramaley et al. | 715/513 |
| 6,661,919 B1 | 12/2003 | Nicholson et al. | |
| 6,748,380 B1* | 6/2004 | Poole et al. | 707/9 |
| 2002/0135621 A1* | 9/2002 | Angiulo et al. | 345/838 |

OTHER PUBLICATIONS

Nava, "Report on XML Packaging, W3C Note Jul. 16, 1999" Adobe Systems, Inc. http://www.w3.org/xml/1999/07/xml-packaging-report.

Nava, "XML Packaging Working Group Charter" Adobe Systems, Inc. http:..www.w3.org/XML/1999/07/xml-packaging-charter, Jul. 14, 1999.

"APPNOTE.TXT—.ZIP File Format Specification, Version 6.2.1", PKWARE, Inc., 1989, retrieved from the internet on Oct. 3, 2005 at http://www.pkware.com/business_and_developers/developer/popups/appnote.txt, 42 pages.

Gudgin, et al. "XML-Binary Optimized Packaging", Jan. 25, 2005, retrieved from the internet on Aug. 1, 2005 at http://www.w3.org/TR/2005/REC-xop10-20050125, 17 pages.

"JAR (file format)", Wikipedia, Aug. 14, 2005, retrieved from the internet on Sep. 29, 2005 at http://en.wikipedia.org/wiki/JAR_%file_format%29, 1 page.

(Continued)

*Primary Examiner*—Shahid Alam
(74) *Attorney, Agent, or Firm*—Fish & Richardson P.C.

(57) ABSTRACT

Methods and apparatus implementing techniques to embed files in an electronic document. User input specifies files to be embedded in an electronic document and metadata to be associated with the specified files in the electronic document. The specified files are embedded in the electronic document in response to the input. A manifest is created in the electronic document. The manifest includes representations of each of the embedded files and the specified metadata. Each representation of the metadata is associated in the manifest with representations of one or more corresponding files of the embedded files. The manifest includes presentation information defining how the representations will be presented to a user.

37 Claims, 4 Drawing Sheets

OTHER PUBLICATIONS

King, "PDF: A Package", Adobe Systems Incorporated, 2001, retrieved from the internet on Oct. 27, 2005 at http://www.planetpdf.com/planetpdf/pdfs/seyboldseminars/ny02/king_jim_PDFAsPackageAnnot.pdf, 23 pages.

"MHTML", Wikipedia, Aug. 20, 2005, retrieved from the internet on Sep. 28, 2005 at http://en.wikipedia.org/wiki/MHTML, 1 page.

"MIME", Wikipedia, Sep. 28, 2005, retrieved from the internet on Sep. 28, 2005 at http://en.wikipedia.org/wiki/MIME, 5 pages.

Nava, "XML Packaging Working Group Charter" Adobe Systems Incorporated, Jul. 25, 2000, retrieved from the internet on Aug. 1, 2005 at http://www.w3.org/XML/2000/07/xml-packaging-charter, 13 pages.

"Portable Document Format", Wikipedia, Sep. 23, 2005, retrieved from the internet on Sep. 23, 2005 at http://en.wikipedia.org/wiki/Pdf, 5 pages.

Wilson, "XML Package (XPackage) Frequently Asked Questions (FAQ)" Global Mentor, Inc., Apr. 4, 2002, retrieved from the internet on Aug. 1, 2005 at http://www.globalmentor.com/reference/specifications/xpackage/faq.html, 3 pages.

"ZIP (file format)", Wikipedia, Sep. 19, 2005, retrieved from the internet on Sep. 28, 2005 at http://en.wikipedia.org/wiki/ZIP_%28file_format%29, 4 pages.

* cited by examiner

GROUP FILE DELIVERY INCLUDING USER-DEFINED METADATA

BACKGROUND

This invention relates to the collection and transmission of a group of files.

It can often be useful to collect multiple files into a single package. Archiving software, such as the WinZip® archiving utility, available from WinZip® Computing, Inc., can be used to collect a group of files into an archive, which can be stored, transmitted and/or downloaded as a single package. Adobe® Acrobat® document management software, available from Adobe Systems Incorporated of San Jose, Calif., can be used to create and manipulate documents in Portable Document Format (PDF). Files of any format can be embedded in a PDF document, and the resulting PDF document, including any embedded files, can be stored and transmitted as a single document.

SUMMARY

The invention provides methods and computer program products that enable the creator or user of an electronic document to embed files in the electronic document, and to insert into the electronic document descriptive information that describes the electronic document and/or the individual embedded files.

In general, in one aspect, the invention features methods and apparatus implementing techniques for embedding files in an electronic document. The techniques include receiving user input specifying files to be embedded in an electronic document and metadata to be associated with the specified files in the electronic document; embedding the specified files in the electronic document in response to the input; and creating a manifest in the electronic document. The manifest includes representations of each of the embedded files and the specified metadata. Each representation of the metadata is associated in the manifest with representations of one or more corresponding files of the embedded files. The manifest includes presentation information defining how the representations will be presented to a user.

Particular implementations can include one or more of the following features. Metadata can be extracted from the embedded files. The manifest can include representations of the metadata extracted from the embedded files. The metadata can include text information, image information or graphics information.

A manifest template can be provided. The manifest template can define a default layout for representations of one or more of the embedded files and the metadata. Creating a manifest in the electronic document can include creating a manifest according to the manifest template.

User input specifying the presentation information can be received. User input specifying behavior to be associated with one or more of the embedded files can also be received. The manifest can include one or more interactive controls that are selectable by a user to perform one or more actions defined by the behavior specified for the corresponding embedded files. The interactive controls can be associated with representations of the embedded files. The interactive controls can also include representations of one or more of the embedded files. The actions can include opening or saving one or more corresponding embedded files.

Embedding the specified files in the electronic document can include creating an electronic document and embedding the identified files in the created electronic document. Embedding the specified files in the electronic document can include embedding the identified files in an existing electronic document. A previous manifest representing a first collection of embedded files can be replaced with a new manifest page representing a second collection of embedded files. Representations of each of the embedded files and the specified metadata can be added to an existing manifest. The manifest created can be added as a second manifest to an electronic document containing a first manifest.

Receiving user input specifying files and metadata can include presenting a user with an interface in which the user can select files to be embedded in the electronic document and/or specify metadata to be associated with the specified files. The manifest can be presented to a user. User input selecting an interactive control in the manifest associated with one or more representations of embedded files can be received. An action can be performed on one or more embedded files according to the selected interactive control.

In another aspect, the invention features methods and apparatus implementing techniques for representing electronic documents. The techniques include receiving an electronic document including one or more embedded files and a manifest; and presenting the manifest to a user according to the presentation information. The manifest includes representations of each of the embedded files and metadata associated with the embedded files. Each representation of the metadata is associated in the manifest with representations of one or more corresponding files of the embedded files. The manifest includes presentation information defining how the representations will be presented to a user Particular implementations can include one or more of the following features. The metadata can include text information, image information or graphics information. The manifest can include one or more interactive controls associated with representations of the corresponding embedded files. The interactive controls can be selectable by a user to perform one or more actions on the corresponding embedded files.

User input selecting an interactive control in the manifest associated with one or more representations of embedded files can be received. An action can be performed on one or more embedded files according to the selected interface control.

In another aspect, the invention features an electronic document. The electronic document includes multiple embedded files, metadata associated with the embedded files, and a manifest including representations of each of the embedded files and metadata. Each representation of the metadata is associated in the manifest with representations of one or more corresponding files of the embedded files. The manifest includes presentation information defining how the representations will be presented to a user.

Particular implementations can include one or more of the following features. The metadata can include metadata extracted from the embedded files. The metadata can include text information, image information or graphics information. The manifest can include one or more interactive controls that are selectable by a user to perform one or more actions defined by behavior specified for the corresponding embedded files.

The invention can be implemented to realize one or more of the following advantages. A manifest of an electronic document can include descriptive information describing files that are embedded in the electronic document. The descriptive information can include system information that identifies each embedded file, and can also include user-specified information, such as information summarizing the contents of the electronic document and/or the individual embedded files, instructions on the use of the document or the embedded files, or the identity of a directory in which the embedded files should be stored. Displaying the descriptive information included in the manifest to a user, such as a recipient, of the electronic document provides a convenient way for the creator of the electronic document to convey specific information about the embedded files to the user. By viewing the descriptive information included in the manifest, the user can access information about the embedded files without having to open and inspect each of the files. The inclusion of interactive controls in the manifest gives the user a convenient way to manipulate the embedded files in a graphical user interface. A security interface can be implemented in the manifest to secure the delivered files.

The manifest can be useful for archival purposes. Integrating documentation with a group of files, so that both are saved together as one file, provides an efficient technique for storing the files. The embedded files can be encoded and compressed within the container document, which makes the package size smaller than the total size of all of the original files.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An electronic document according to the invention includes one or more embedded files, metadata including descriptive or instructive information about the electronic document and/or the embedded files, and, optionally, one or more selectable controls for relevant operations that can be performed on or with associated embedded files. The electronic document according to the invention also includes presentation information specifying how the content of the electronic document will be presented to a user. Thus, an application opening the electronic document determines how to present the document to the user based on the information in the document. An electronic document does not necessarily correspond to a file. An electronic document may be stored in a portion of a file that holds other documents or in a single file dedicated to the document in question.

Any type of file, including any MIME type, can be packaged in the electronic document. A file, as used in this specification, refers to an entity of data, i.e., a string of bytes, that is capable of being manipulated as an entity. Files can represent any kind of information, such as text, images, executables, or simply binary data.

Figure 1:
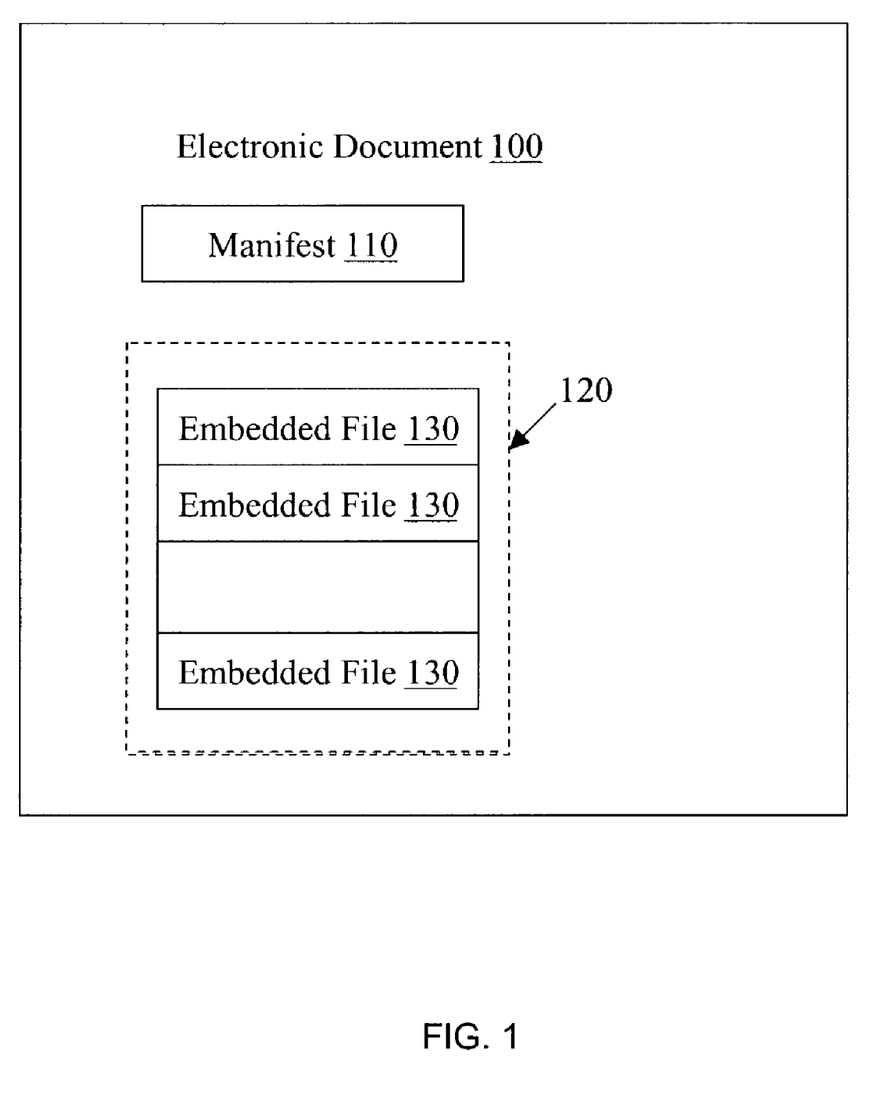
FIG. 1 is a block diagram illustrating an implementation of an electronic document for transmitting a group of files.

FIG. 1 is a block diagram illustrating an implementation of an electronic document 100. Electronic document 100 includes a collection of embedded files 120 and a manifest 110. The electronic document includes presentation information defining how the content of the electronic document, including the manifest 110, will be presented to a user, such that manifest 110 is presented to the user in the electronic document according to the presentation information when the electronic document is opened. The collection of embedded files 120 can include files of any type, such as text files, spreadsheets, Portable Document Format ("PDF") documents, executable files (e.g., computer programs), etc. The collection of embedded files 120 can include any number of files 130. Each file 130 of the collection of files 120 is accessible through the manifest 110.

In one implementation, the electronic document 100 is a PDF document, and manifest 110 is a PDF page that can be created using, e.g., Adobe® Acrobat® software available from Adobe Systems Incorporated of San Jose, Calif. The files 130 in the collection of files 120 can be embedded in the electronic document 100 using, for example, the data import or file attachment tool in the software.

Figure 2:
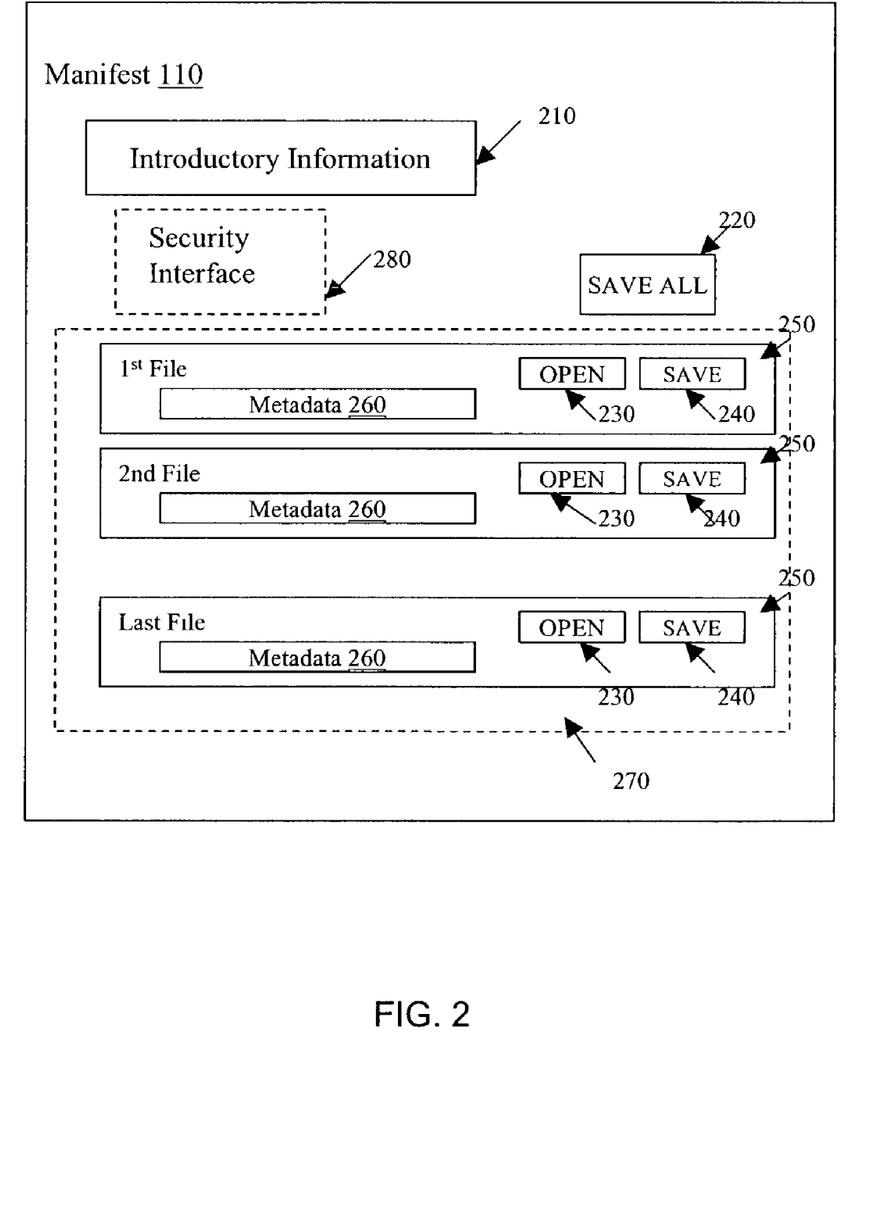
FIG. 2 is a block diagram illustrating an implementation of a manifest for an electronic document for transmitting a group of files.

FIG. 2 is a block diagram illustrating an implementation of a manifest 110. The manifest 110 is automatically created when a user chooses to create an electronic document 100 including a collection of embedded files 120 or when files are embedded into an existing electronic document 100. The manifest 110 includes metadata associated with the electronic document 100 to describe the electronic document 100 and its embedded files, such as instructions how to use the embedded files. Thus, a separate instruction file need not be included with the embedded files 130 or electronic document 100.

The manifest 110 includes a list 270 of files 130 embedded in the electronic document 100, and a field for introductory material 210. The manifest can also include information specifying behavior to be associated with one or more of the embedded files. The specified behavior can include operations to perform on each of the files 130 or the collection of files 120. The operations that are available to a user can be selected by the creator of the electronic document 100. The specified behavior can be implemented in the manifest as interactive features of the presentation such as dialog boxes, action buttons or radio buttons. Computer code, such as a JavaScript to trigger actions related to the control buttons can be embedded in the electronic document 100.

The specified behavior can include any operations that can be performed on a file. For example, the specified behavior can include saving, opening, deleting, sending or copying one or more of the files 130 or the collection of files 120. The specified behavior can also include replying to a sender of the collection of files 120 or notifying others of the reception of the collection of files 120. The creator of the electronic document 100 can choose which of the operations will be available to a user of the document, and if the user will be given any options at all. For example, the creator can choose to have the electronic document automatically save the files 130 or the collection of files 120 in the user's system.

If the creator chooses to allow the user to have a choice of operations, the creator can also choose how to present the user with the available operations. The creator can choose to present the user with a dialog box including one or more of the operations available to the user. The creator can also choose to include interactive controls, such as interactive controls 220, 230, 240, in the manifest 110.

In the example of the manifest 110 shown, the manifest 110 includes a "SAVE ALL" interactive control 220 that is operable to save all of the files embedded in the document, an "OPEN" interactive control 230 associated with each of the embedded files, and a "SAVE" interactive control 240 associated with each of the embedded files. Each of the "OPEN" interactive controls 230 can be selected by a user to open the associated embedded file. The "SAVE" interactive control 240 can be selected by the user to save the file in another directory or medium. For example, the user can save each of the files 130 to a hard disk.

The introductory information 210 can include system information that is automatically inserted into the manifest 110, such as the file name for the electronic document 100, the time the electronic document 100 was created, and the number of files 130 embedded in the electronic document 100. Some of the introductory information can be changed, such as the file name of the electronic document. The creator of the electronic document 100 can also input additional introductory information 210 regarding the electronic document 100, such as what the collection of files 120 represents or instructions regarding the use of the of the electronic document 100 and its embedded files. For example, the introductory information 210 could describe an application that can be installed into a computer system by installing the collection of files 120.

The list 270 includes an entry 250 for each file 130 embedded in the electronic document 100. Each entry 250 includes a field for metadata 260. The metadata can include automatically generated system information, such as file name, file size, date of creation, etc. The metadata can also include information from within the file. Thus, if the file includes photographic images and metadata of people in the images, the automatically generated system information can include names of people who are depicted in the images in the file. Adobe Systems Inc.'s eXtensible Metadata Platform® (XMP®) is an example of an open framework for storing and retrieving metadata from within electronics documents.

The metadata 260 also includes descriptive information entered by the creator of the electronic document (e.g., the person responsible for embedding the files in the electronic document) after the files 130 are embedded or during the embedding process. This descriptive information can include any information the creator thinks might be useful to a user of the electronic document 100, such as a summary of what the corresponding embedded file 130 contains, instructions for its use, or a directory in which the file 130 should be saved.

The security interface 280 can allow the creator of the electronic document 100 to limit access to the electronic document 100. The security interface 280 can be implemented using encryption techniques including passwords and public/private key techniques ("PPK"). For example, the security interface can be configured to make the manifest visible or accessible in the electronic document only upon receipt of a valid password. Known techniques such as Electronic Digital Signatures can be used to provide for signature and validation. For example, the security interface 280 can include user identification and password entry fields. Thus, the security interface 280 can allow access to access to all or a part of the files 130 in the electronic document 100 only to users who have been given permission upon successful entry of user identification and password information.

The security interface 280 can also include the creator's signature, which can be used in addition to using password protection for the manifest to secure the embedded files. Any change to the embedded files will invalidate the creator's signature. In contrast, regular E-mail file attachments may be easily changed or replaced, particularly when forwarding the email.

Figure 3:
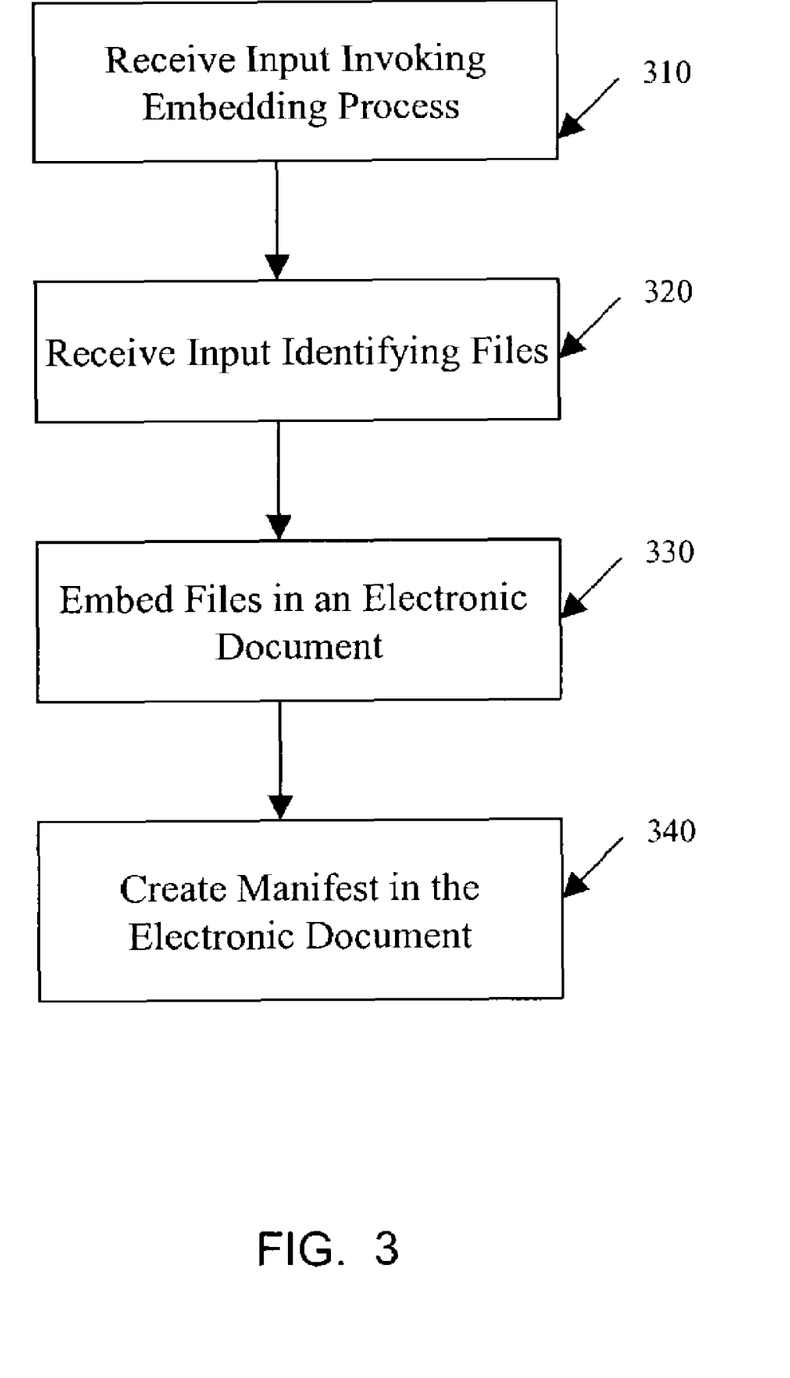
FIG. 3 is a flow diagram illustrating an implementation of a method for embedding a group of files in an electronic document.

FIG. 3 is a flow diagram illustrating an implementation of a method for embedding a collection of files in an electronic document. A system receives input invoking an embedding process (step 310). Receiving input invoking the embedding process can include, for example, selection of a file attachment tool in a document management application, such as Adobe® Acrobat® software.

The system receives input identifying files 130 to be included in an electronic document 100 (step 320). The system can present the user with a list of files, such as a list of files in a file directory, from which the user can choose the files to embed. The input identifying files to be embedded can include descriptive information 260 about each file as described above. For example, after a file has been selected, the system can present the creator of the electronic document 100 with an interface in which to specify metadata 260 to be associated with the file 130, such as a summary of the file 130. Alternatively, the electronic document creator can be permitted to specify metadata after the file or files have been embedded in the electronic document 100.

The system can present the electronic document creator with options regarding what a receiving user of the electronic document 100 will be able to do with the files 130. The electronic document creator can choose whether the receiving user will have options of what operations to perform on the files, such as saving, opening, deleting, sending, copying, etc. The electronic document creator can choose how to present the receiving user with the choices, as described above with respect to FIG. 2. For example, the electronic document creator can hide some files or controls for specified users. The system can present the electronic document creator with an interface in which to specify the options the receiving user will be presented.

The system embeds the files 130 in the electronic document 100 (step 330). In one implementation, the steps 320 and 330 can be performed for each file 130 to be embedded. Thus, a user can choose one file 130 at a time to embed in the electronic document 100. As each file 130 is embedded, the user will be given the option of continuing or ending the embedding process. If the user chooses to continue, the system returns to step 320 and allows another file 130 to be chosen. If the user chooses to end the embedding process, the system goes on to step 340. Optionally, the system can also be configured to allow the user to select more than one file at a time to be embedded.

The system creates a manifest 110 in the electronic document 100 (step 340). The system can automatically generate the manifest 110 based on a template. The template can include sections (e.g., predefined fields) for introductory information 210, the security interface 280, the user interface controls 220, 230, 240, the metadata 260 and the list of files 270.

At any time during or after creation of the manifest 110, the system can populate the manifest 110 with introductory information 210 about the electronic document 100, and the file information for each file entry 250. The system can also extract metadata from the files, using conventional metadata extractions methods, and add the extracted metadata to the manifest 110. At this point, the user can also add to or change some or all of the introductory information 210, such as adding information regarding the electronic document 100 or changing the file name listed for the electronic document 100. When the user indicates that he or she is finished adding information—for example, by selecting a "DONE" button in the user interface—the system generates the completed manifest 110.

The electronic document 100 can be an existing electronic document 100 that is updated to include embedded files 130 or to include additional embedded files 130. The manifest 110 can be generated as a new page of the electronic document 100, replacing any previous manifest 110 that already exists in the electronic document 100. Alternatively, the new manifest 110 can be generated only for newly added embedded files, such that there is more than one manifest 110 in electronic document 100, or by adding representations of each of the embedded files and the specified metadata to an existing manifest.

Figure 4:
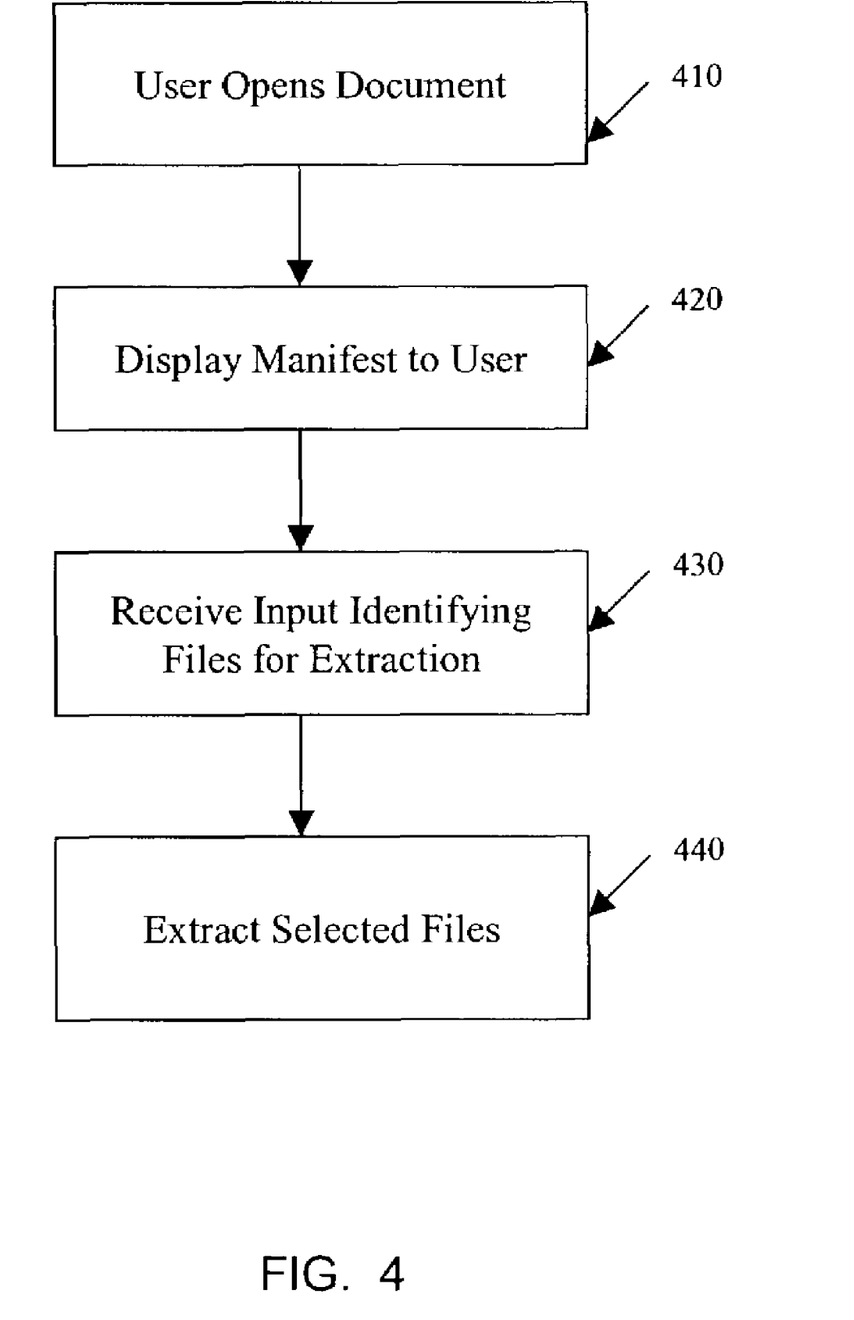
FIG. 4 is a flow diagram illustrating an implementation of a method for saving a group of files from an electronic document.

FIG. 4 is a flow diagram illustrating an implementation of a method for extracting files 130 in a collection of files 120 from an electronic document 100. The method begins when a user selects and opens the electronic document 100 (step 410). The user can be a recipient of the electronic document 100, if the electronic document 100 is transmitted, or any other user that is given access to the electronic document 100. The user can also include the creator of the electronic document 100.

The system displays the manifest 110 to the user (step 420). The manifest 110 displayed is the page generated at the conclusion of the process described with reference to FIG. 3. The user is thus able to view the introductory information describing the electronic document 100 and the collection of embedded files 120, as well as metadata 260 describing the individual embedded files 130. The user can use this information to identify one or more of the embedded files 130 to open, save, copy, delete or send.

The system receives input identifying one or more of the files 130 in the electronic document 100 to be extracted (step 430). The input can include a selection of one of the interactive controls 220, 230, 240 by the user or a selection from a dialog box by the user. One or more of the interactive controls, such as the "OPEN" interactive control 230 and the "SAVE" interactive control 240, can be part of or associated with each file entry 250, as described above. In response to this input, the system extracts the identified files (step 440). For example, the system can send a file to another user if the user selects "SEND" from a dialog box corresponding to a file entry 250. In another example, the system can open a file 130 if the user selects the "OPEN" interactive control 230 corresponding to the corresponding file entry 250. Optionally, if the user does not have on his or her system an application that is required to open a particular embedded file, the system can display an error message if the user selects an "OPEN" interactive control associated with the file. Alternatively, the system can be configured to omit the "OPEN" interactive control for any file that cannot be opened with available applications, or to display the "OPEN" interactive control for such files as being disabled—for example, by graying out the "OPEN" interactive control for each such file.

The system can save a file to a specific location if the user selects the "SAVE" interactive control 240 corresponding to the file entry. If the user selects the "SAVE ALL" interactive control 220, the system saves all of the embedded files to a specified location. If the user selects either the "SAVE" interactive control 240 or the "SAVE ALL" interactive control 220, the system can save one or all of the files to a storage medium or directory of the user's choice at step 440. The system can present the user with a dialog allowing the user to choose a location, such as a directory, in which to save the file(s). The location can be a hard disk, a floppy disk, or other storage medium. Upon receiving the user's selection, the system can save the file(s) to that location.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. Also, the electronic document 100 may include other electronic documents 100 containing embedded files or, conversely, the electronic document 100 can be embedded in another electronic document 100. Also, the invention can be implemented as a separate computer program or integrated into other programs. Files accessible through networks, as well as local files, can be embedded into the electronic document 100.

Further, the invention can be used for file organization as well as file delivery (e.g., the method can be used to group files for file management and data storage). For example, the manifest can be stored separately from the embedded files. The file(s) can be put into a document archive and the manifest can contain enough information about the files so that they can be automatically retrieved. This gives the same effect as if all of the embedded files are contained within one file, even where the manifest and embedded files are stored in separate locations (such as a document database). Accordingly, other embodiments are within the scope of the following claims.

What is claimed is:

1. A computer-implemented method, comprising:
receiving user input specifying files to be embedded in an electronic document and metadata to be associated with the specified files in the electronic document;
embedding the specified files in the electronic document in response to the input;
receiving user input specifying behavior to be associated with one or more of the embedded files; and
creating a manifest in the electronic document, the manifest including representations of each of the embedded files and the specified metadata, each representation of the metadata being associated in the manifest with representations of one or more corresponding files of the embedded files, the manifest including presentation information defining how the representations will be presented to a user, the manifest including one or more interactive controls, the interactive controls being selectable by a user to perform one or more actions defined by the behavior specified for the corresponding embedded files.

2. The method of claim 1, further comprising:
extracting metadata from the one or more of the embedded files;
wherein the manifest includes one or more representations of metadata extracted from the embedded files.

3. The method of claim 1, wherein:
the metadata includes text information, image information or graphics information.

4. The method of claim 1, further comprising:
receiving user input specifying the presentation information.

5. The method of claim 1, wherein:
one or more of the interactive controls are associated with representations of the corresponding one or more of the embedded files.

6. The method of claim 1, wherein:
one or more of the interactive controls include representations of one or more of the embedded files.

7. The method of claim 1, wherein:
the one or more actions include opening or saving one or more corresponding embedded files.

8. The method of claim 1, wherein:
embedding the specified files in the electronic document includes creating an electronic document and embedding the identified files in the created electronic document.

9. The method of claim 1, wherein:
embedding the specified files in the electronic document includes embedding the identified files in an existing electronic document.

10. The method of claim 9, further comprising:
replacing a previous manifest representing a first collection of embedded files with a new manifest page representing a second collection of embedded files.

11. The method of claim 9, wherein creating the manifest includes adding representations of each of the embedded files and the specified metadata to an existing manifest.

12. The method of claim 9, further comprising adding the manifest as a second manifest to an electronic document containing a first manifest.

13. The method of claim 1, wherein:
receiving user input specifying files and metadata includes presenting a user with an interface in which the user can select files to be embedded in the electronic document and/or specify metadata to be associated with the specified files.

14. The method of claim 1, further comprising:
presenting the manifest to a user.

15. The method of claim 14, further comprising:
receiving user input selecting an interactive control in the manifest, the selected interactive control being associated with one or more representations of embedded files; and
performing an action on one or more embedded files according to the selected interactive control.

16. A computer-implemented method, comprising:
receiving user input specifying files to be embedded in an electronic document and metadata to be associated with the specified files in the electronic document;
embedding the specified files in the electronic document in response to the input;
receiving user input specifying behavior to be associated with one or more of the embedded files;
providing a manifest template, the manifest template defining a default layout for representations of one or more of the embedded files and the metadata; and
creating a manifest in the electronic document according to the manifest template, the manifest including representations of each of the embedded files and the specified metadata, each representation of the metadata being associated in the manifest with representations of one or more corresponding files of the embedded files, the manifest including presentation information defining how the representations will be presented to a user, the manifest including one or more interactive controls, the interactive controls being selectable by a user to perform one or more actions defined by the behavior specified for the corresponding embedded files.

17. The method of claim 16, further comprising:
receiving user input specifying the presentation information.

18. The method of claim 16, wherein:
embedding the specified files in the electronic document includes creating an electronic document and embedding the identified files in the created electronic document.

19. The method of claim 16, wherein:
embedding the specified files in the electronic document includes embedding the identified files in an existing electronic document.

20. The method of claim 19, further comprising:
replacing a previous manifest representing a first collection of embedded files with a new manifest page representing a second collection of embedded files.

21. The method of claim 16, wherein:
receiving user input specifying files and metadata includes presenting a user with an interface in which the user can select files to be embedded in the electronic document and/or specify metadata to be associated with the specified files.

22. A computer program product, tangibly stored on a computer-readable medium, comprising instructions operable to cause a computer system to:

receive user input specifying files to be embedded in an electronic document and metadata to be associated with the specified files in the electronic document;

embed the specified files in the electronic document in response to the input; and receive user input specifying behavior to be associated with one or more of the embedded files; and create a manifest in the electronic document, the manifest including representations of each of the embedded files and the specified metadata, each representation of the metadata being associated in the manifest with representations of one or more corresponding files of the embedded files, the manifest including presentation information defining how the representations will be presented to a user, the manifest including one or more interactive controls, the interactive controls being selectable by a user to perform one or more actions defined by the behavior specified for the corresponding embedded files.

23. The computer program product of claim 22, further comprising instructions operable to cause a computer system processor to:

extract metadata from the one or more of the embedded files;

wherein the manifest includes one or more representations of metadata extracted from the embedded files.

24. The computer program product of claim 22, wherein: the metadata includes text information, image information or graphics information.

25. The computer program product of claim 22, further comprising instructions operable to cause the computer system to:

receive user input specifying files to be embedded in an electronic document and metadata to be associated with the specified files in the electronic document;

embed the specified files in the electronic document in response to the input;

receive user input specifying behavior to be associated with one or more of the embedded files;

provide a manifest template, the manifest template defining a default layout for representations of one or more of the embedded files and the metadata;

create a manifest in the electronic document according to the manifest template, the manifest including representations of each of the embedded files and the specified metadata, each representation of the metadata being associated in the manifest with representations of one or more corresponding files of the embedded files, the manifest including presentation information defining how the representations will be presented to a user, the manifest including one or more interactive controls, the interactive controls being selectable by a user to perform one or more actions defined by the behavior specified for the corresponding embedded files.

26. The computer program product of claim 22, further comprising instructions operable to cause the computer system to:

receive user input specifying the presentation information.

27. The computer program product of claim 22, further comprising instructions operable to cause the computer system to:

associate one or more of the interactive controls with representations of the corresponding one or more of the embedded files.

28. The computer program product of claim 22, further comprising instructions operable to cause the computer system to:

include representations of one or more of the embedded files in one or more of the interactive controls.

29. The computer program product of claim 22, wherein: the one or more actions include opening or saving one or more corresponding embedded files.

30. The computer program product of claim 22, wherein the instructions operable to cause the computer system to embed specified files in the electronic document include instructions operable to cause the computer system to:

create an electronic document and embed the identified files in the created electronic document.

31. The computer program product of claim 22, wherein the instructions operable to cause the computer system to embed specified files in the electronic document include instructions operable to cause the computer system to:

embed the identified files in an existing electronic document.

32. The computer program product of claim 31, further comprising instructions operable to cause the computer system to:

replace a previous manifest representing a first collection of embedded files with a new manifest page representing a second collection of embedded files.

33. The computer program product of claim 31, wherein the instructions operable to cause the computer system to create the manifest include instructions operable to cause the computer system to:

add representations of each of the embedded files and the specified metadata to an existing manifest.

34. The computer program product of claim 31, further comprising instructions operable to:

cause the computer system to add the manifest as a second manifest to an electronic document containing a first manifest.

35. The computer program product of claim 22, wherein the instructions operable to cause the computer system to receive user input specifying files and descriptive information include instructions operable to cause the computer system to:

present a user with an interface in which the user can select files to be embedded in the electronic document and/or specify descriptive information to be associated with the specified files.

36. The computer program product of claim 22, further comprising instructions operable to cause the computer system to:

present the manifest to a user.

37. The computer program product of claim 22, further comprising instructions operable to cause the computer system to:

receive user input selecting an interactive control in the manifest, the selected interactive control being associated with one or more representations of embedded files; and perform an action on one or more embedded files according to the selected interactive control.

* * * * *

UNITED STATES PATENT AND TRADEMARK OFFICE
CERTIFICATE OF CORRECTION

| | |
|---|---|
| PATENT NO. | : 7,089,248 B1 |
| APPLICATION NO. | : 10/288322 |
| DATED | : August 8, 2006 |
| INVENTOR(S) | : King et al. |

Page 1 of 1

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (566) days Delete the phrase "by 566 days" and insert -- by 612 days--

Signed and Sealed this

Sixth Day of March, 2007

JON W. DUDAS
*Director of the United States Patent and Trademark Office*